Aug. 22, 1961 G. DIRKS 2,997,417

METHOD OF PREPARING RECORD CARRIER

Filed March 30, 1955 2 Sheets-Sheet 1

INVENTOR
Gerhard Dirks
BY Michael S. Striker
agt.

Aug. 22, 1961 G. DIRKS 2,997,417

METHOD OF PREPARING RECORD CARRIER

Filed March 30, 1955 2 Sheets-Sheet 2

INVENTOR
Gerhard Dirks
BY Michael S. Striker
agt.

United States Patent Office 2,997,417

Patented Aug. 22, 1961

2,997,417

METHOD OF PREPARING RECORD CARRIER

Gerhard Dirks, 44 Morfelder Landstrasse, Frankfurt am Main, Germany

Filed Mar. 30, 1955, Ser. No. 498,059
Claims priority, application Great Britain Dec. 23, 1954
5 Claims. (Cl. 154—118)

This invention relates to office machines controlled electrically by information stored as signals on sheets, strips, tapes, cards or the like.

The invention relates to a method of operating an office machine for computing, printing, sorting and like tasks and using information sheets or the like, wherein signals are magnetically sensed and/or recorded on such sheets or the like in a plurality of column areas by the same sensing and/or recording heads successively. Such signals may be recorded on a magnetizable area which is applied to the sheet directly, or which is first prepared on an adhesive strip subsequently attached to the sheet or the like. In the former case the magnetizable material may be applied to the sheet at the time of effecting the first recording, or earlier, and in the latter case also, the adhesive strip may be applied to the sheet at the time of effecting the first recording, or earlier.

A feature of the invention therefore is a method of applying a magnetizable tape having an adhesive surface on one side to record carrier.

The signals can be arranged in the magnetizable signal carriers in different ways. The signals themselves are either single magnetic signals of a certain direction and amplitude or a certain sequence of frequencies or not frequencies, whereby either a frequency or the absence of a frequency can indicate a signal. Such signals can also consist of phase-shifting signals, certain phases or frequencies being altered by certain degrees. In any case, all these signals are preferably of the so-called yes-or-no signals type, or black-and-white signals type. Suitable alternative types of signal recordings are set forth in by copending patent application Serial No. 432,093, filed May 25, 1954, and now abandoned.

The recording of signals in proper juxta-position on the carriers and the marking of the zero-position can be effected in various ways. For instance, the edge of a perforation or opening in the carrier can serve as a zero-position (e.g. with perforations like those on photo-sensitive films). Instead of such a positioning of the zero-position relatively to mechanical characteristics of the tape itself, magnetic marks or signals can be recorded on the carrier for the purpose of marking zero-positions, or as synchronizing marks. For machines with a low speed, this can be done in that, similar to the principle applied in the start-stop teletyper, either the breaking of the closed circuit current modulation, or a start impulse will introduce every new symbol. The process of signal-recording thereby becomes in its exact statement independent of any mechanical parts or changeable conditions of the record means.

The signal can be given also by a timing difference, that is, the local distance on the tape between the start signal and the digit signal. The two signals, the meaning of which is indicated by their timing difference, otherwise can be replaced by one single signal with a characteristic length. For instance, the beginning of the signal will be effective as a start signal, while the end of the signal corresponds to the said digit signal.

Alternatively, the beginning of the signal can be effective as a digit signal, while the end of it is given in a definite timing instant. It can be useful to provide a constant current system, in which case the signals will appear as interruptions of the record.

For machines with a higher speed, however, the start-stop signals will be replaced by the control frequency or synchronizing signals of an electronic switch or of a motor, electronically synchronized to the phase of the tape control frequency.

By means of these signals it is possible to control the printing of digits and/or characters, or the effecting of commands or the correct adjustment of the element to be printed relative to a printing unit, in respect of lines or the like.

Figures 1, 2, 3, 4, 5, 6, 7, 9:
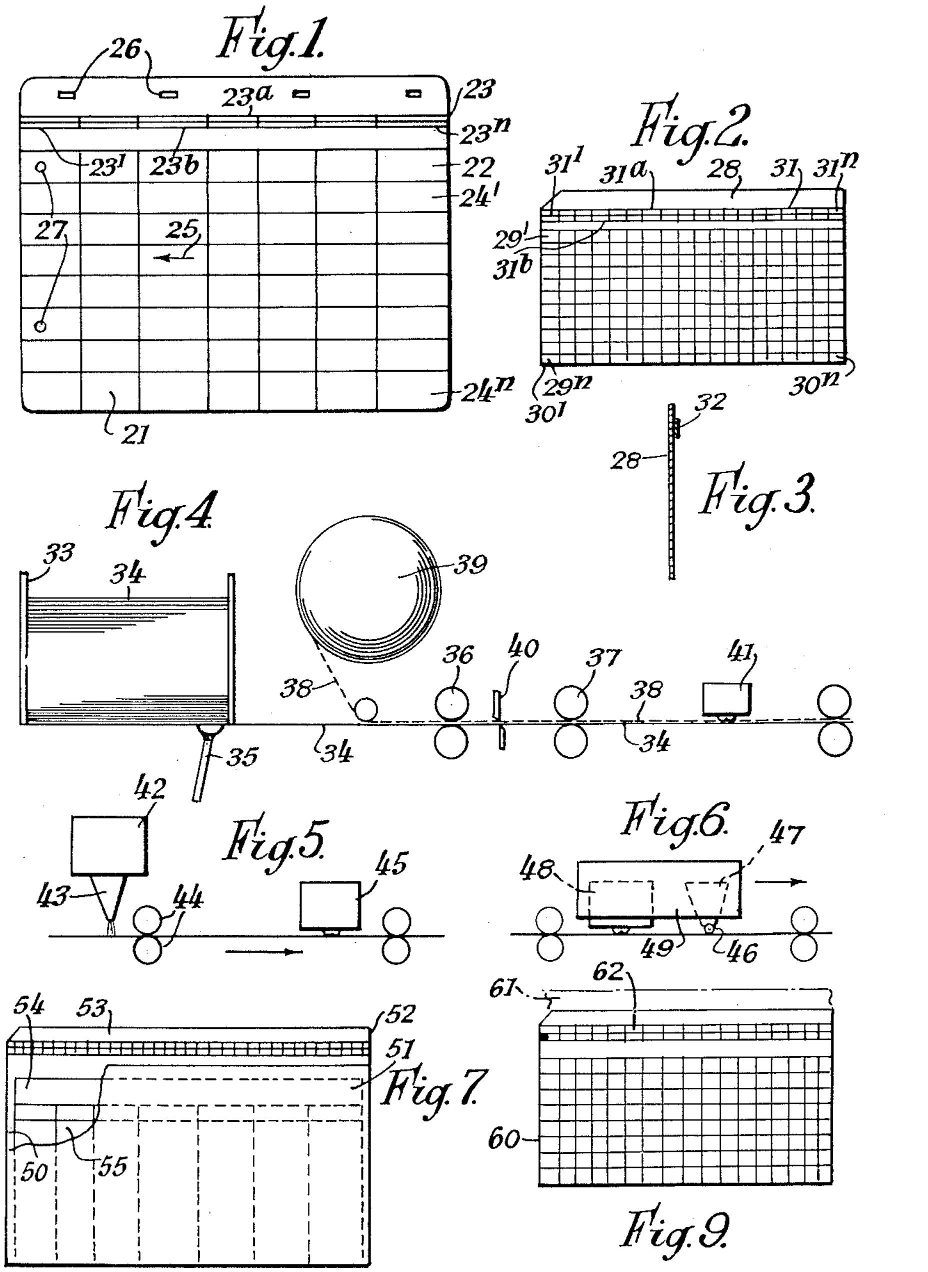
FIG. 1 is an illustration of an embodiment of an information sheet such as a sheet from a loose leaf ledger or the like, and carrying a magnetizable track for signals.
FIG. 2 is a similar view of an embodiment of an information sheet in the form of or in the shape of the usual punched card.
FIG. 3 is a cross section through the card shown in FIG. 2 and illustrating the attachment of a separately-formed magnetic record strip to a card.
FIG. 4 illustrates diagrammatically one embodiment of a method of applying a magnetic adhesive strip to the information sheet at the time of first recording signals thereon.
FIG. 5 is a diagrammatic view of one embodiment of a method of spraying a magnetic record material on to an information sheet at the time of recording signals thereon.
FIG. 6 is a similar diagram illustrating one embodiment of a method of printing a magnetic record material on to the sheet at the time of recording signals thereon.
FIG. 7 is a view of an embodiment of a carrier in the form of an envelope bearing the magnetic record strip and adapted to hold one or more replaceable information sheets.
FIG. 9 is a view of a punched card type of information sheet illustrating means for transferring magnetic signals thereon to a tape or wire.

Referring now to FIG. 1, an information sheet is shown in the form of a ledger account 22 having printed thereon columns 21 and having also thereon an elongated narrow width magnetizable strip 23 which strip is divided into imaginary lengths $23^{1-n}$ one for each line $24^{1-n}$ of information to be shown or capable of being shown on the sheet 22, and such that in the passage of the sheet over signal heads in a direction of the arrow 25 the successive section $23^{1-n}$ of the magetizable strip can be sensed and/or recorded serially, and thereby the whole content of the sheet be dealt with.

The magnetizable strip 23 may be considered as made up of two longitudinal parts, one (for example, the upper one 23$^a$) for the receipt of information signals and the other (for example, the lower one 23$^b$) for the receipt of synchronizing signals, the information signals having a determined relationship with the synchronizing signals either as to position or as to a time instant during a cycle of sensing and/or recording operations, so that, in either case, the value or significance of the information signals is quite independent of the position of those signals relatively to the edges of the sheet or to any printed or written matter on the sheet.

It will be understood that, with the sheet containing for example 100 horizontal lines for visual information, and having the strip 23 divided into 100 successive portions 23$^{1-100}$, the passing of the sheet over signal heads in the direction of the arrow 25 results in the whole content of the sheet being sensed and/or recorded serially in one run through.

The sheet 22 is also provided with transport holes 26 to assist in the feeding of the sheet past the signal heads 16 and 17 and past the printer 11, and there may be punched holes 27 for the filing of the sheet in a binder or the like.

Referring now to FIG. 2 there is shown a card of the shape and size of the normal Hollerith or like punched card but without punched holes. This card 28 is provided with horizontal lines 29$^{1-n}$ and vertical columns 30$^{1-n}$, for example 80 or 120 columns 30 and say 12, 20 or more of horizontal lines 29.

There is also the elongated narrow width magnetizable strip 31 which, similarly as with the sheet 22 in FIG. 1, is divided lengthwise into (imaginary) successive sections 31$^{1-n}$, one for each line or one for each column of the card, so that in a single passage of the card past signal heads, the whole content of the card can be read or recorded as magnetic signals. In this case, also the magnetic strip may be regarded as having a portion 31$^a$ for information signals and another portion 31$^b$ for synchronizing signals, and there may also be transport holes in the card to assist in feeding it past the signal heads.

The magnetizable strips shown in FIGS. 1 and 2 may be applied to the information sheets in a variety of ways. For example, the magnetizable material may be printed, sprayed or otherwise applied directly to the sheets or, the magnetizable material may be carried by an adhesive strip which is subsequently attached to the paper or like information sheet. FIG. 3 shows a case in which the sheet or card 28 has the magnetizable area strip 31 on an attached strip 32 attached by adhesive.

It will be readily understood that, in all cases, since the significance of the signals is not in any way dependent merely on their position on the sheet but, because of their determined relationship with the synchronizing signals they and the synchronizing signals may be placed on the magnetizable area of the sheet irrespective of any edge formation or other physical characteristics of the sheet, and it is not necessary to take care of any special treatment of the paper or other material to prevent shrinkage or the like.

Instead of the sheets being previously prepared with the magnetizable area or areas and bought by the user already equipped with a magnetizable strip, such strip may be applied to the sheet automatically at the time of first recording signals on the sheet as shown diagrammatically in FIG. 4. In FIG. 4, there is a hopper or box 33 for sheets 34, a picking mechanism 35 for feeding the sheets one by one to pairs of feed rollers 36, 37, and as the sheets are fed forward they are provided with an adhesive strip 38 from a reel or coil 39, this strip having been prepared with the magnetizable material and being self adhesive to paper sheets when pressed thereon as by the rollers 36. As the sheets 34 bearing the attached strips 38 are fed forward, they are cut off to predetermined lengths by the cutters 40 and are then passed to signal heads 41 for the recording and/or sensing of signals, which may be effected either by moving the signal heads relatively to stationary sheets or by moving the sheets relatively to stationary signal heads.

In FIG. 5, an alternative arrangement is shown wherein there is a vessel 42 for a quick-drying printing medium containing a magnetizable material, which printing medium (colored or colorless) is sprayed by the nozzle 43 on to the sheets as they pass below the nozzle, under the control of the rollers 44 and, after a period of time sufficient for the drying of the ink the sprayed-on strip may be used for the recording and sensing of signals by the signal heads 45.

FIG. 6 illustrates a modification in which, instead of a liquid ink a paste ink is used, such as, for example, is used in ball-point pens, which ink may be colored or may be colorless and is applied to the information sheet by a ball or roller 46 in a container 47, the ink being quick-drying and non-smudging and continuously supplied to the ball or roller, whereby immediately after the printing operation signals may be recorded thereon magnetically by the signal head 48. The writing or printing elements 46 and 47 and the signal heads 48 are carried by a common mounting 49 so as to maintain their determined spaced relationship.

Instead of the magnetic record material being provided on the information sheets themselves, it may be provided on a carrier for the sheets so that the same carrier and its record material may be used repeatedly with interchangeable information sheets, the sheets being changed by replacement, or being added to the carrier cumulatively. FIG. 7 shows an arrangement where there is an envelope 50 having a lower front wall 51 and a higher back wall 52 and having the elongated narrow-width magnetic strip 53 on the protruding (higher) part of the back wall 52. Within the envelope which, for the sake of clearness, is shown broken away at one corner, an information sheet 54 is placed, having columns 55 for information and there may be means for positioning the sheet 54 within defined limits in the carrier. The arrangement is such that the whole content of the sheet 54 (or the topmost sheet of a cumulative assembly) may be recorded and sensed on the strip 53 serially in one run through the machine. Also, when the information sheet 54 is full or is no longer required it may be discarded, the magnetic record erased and the same carrier 50 used again with other information sheets.

Figure 8:
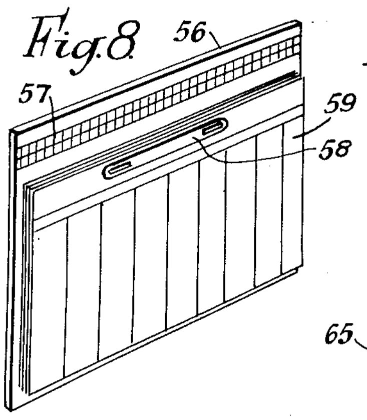
FIG. 8 is a perspective view of a carrier in the form of a flat board or backing having a magnetic record strip and having means for attaching a plurality of printed information sheets thereto in a removable manner.

FIG. 8 shows an alternative in which, instead of an envelope, there is a board or backing element 56 having the magnetic record strip 57 and having means such as a clamp 58 for the attachment of information sheets 59, which sheets may be torn off as they are filled, or may have additional sheets clamped on top of them.

In FIG. 9, the card 60, resembling in form a Hollerith type of card, is shown as associated with a magnetic tape 61 to which signals from the signal track 62 (both information signals and synchronizing signals) may be transferred in any known manner, the information signals being transferred without change of their value or significance.

Figure 10:
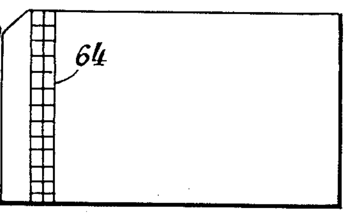
FIG. 10 is an illustration of a Hollerith type of card in which the magnetic record strip is arranged transversely of the card, namely in the direction of normal feeding.

In all the examples illustrated so far the magnetic record strip has been arranged longitudinally of the information sheet but this is not an essential, as is illustrated in FIG. 10, where the card has the magnetic record strip 64 arranged transversely of its length, such strip 64 being divided into (imaginary) successive sections each corresponding to a line or column of the card, so that the whole content of the card may be read at one run through the machine. The sensing and/or recording heads in all cases may be arranged to operate in series or in parallel, in dependence on the arrangement of the signal heads relatively to the direction of the sensing and recording movement.

Figure 11:
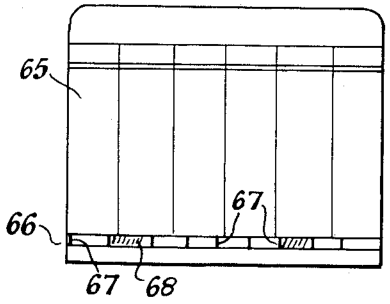
FIG. 11 is a view of an information sheet such as a store sheet, voucher or the like carrying permanent synchronizing signals of an optical or magnetic type and adapted for the addition of magnetic information signals either manually or by signal heads.

FIG. 11 shows a modified form of information sheet which has printed columns 65 for information which may be printed or written thereon, and having a magnetic signal track 66 on which are permanently recorded synchronizing signals 67 one for each deonomination area or one for each column area. These signals 67 may be of an optical nature e.g. photographically recorded, or may be magnetic signals. In the spaces between the synchronizing signals 67, information signals may be provided such as the signals 68 which may be written in with a pen or pencil containing magnetic record material in the ink or other writing medium, or may be applied by magnetic signal heads. In either case, in one run of the sheet through the machine the synchronizing signals and the information signals for all the columns may be sensed and/or recorded denomination by denomination successively.

Figure 12:
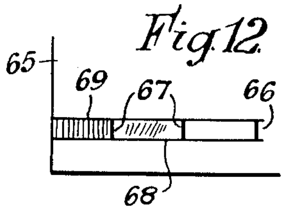
FIG. 12 is a fragmentary view of a part of an information sheet, for example as shown in FIG. 12, but also bearing commencement signals for indicating the commencement of sensing and/or recording in a fresh group of signal areas.

In cases where a series of groups of sheets is to be sensed or recorded in succession, group control may be effected by providing group signals or commencement signals such as are shown at 69 in FIG. 12, at the beginning of each group. These signals 69 are at the beginning of the track 66 and are of a different character from the synchronizing signals 67 as well as from the information signals 68. In the sensing and/or recording of a sheet equipped with such various signals, the signals 69 indicate the commencement of a fresh group of signals passing through, and by passing these to a comparing device, for example such as is set forth in my copending patent application Serial No. 498,047, filed March 30, 1955, sorting and other control of groups may be effected.

Figure 13:
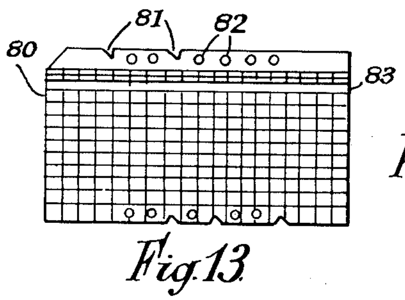
FIG. 13 is a face view of punched card type of information sheet having notches and holes in its edges for sorting of the cards by needles and the like in a known manner.

Referring now to FIG. 13, the card 80 is provided at its edges with notches 81 and holes 82 so that a batch or group of such cards may be sorted by means of needles and rods in a well-known manner Each card bears the magnetic record strip 83 for information signals and synchronizing signals, this strip being divided into sections representing the various deonomination areas or column areas of the card, as in FIGS. 1 and 2. In any of the cases shown, the magnetic record area, whether directly on the sheet or on an attached strip, may be on the front of the sheet, that is, on the same side as any printed or written matter, or may be on the back of the sheet, that is on the side opposite to that having the printed or written matter.

Figure 14:
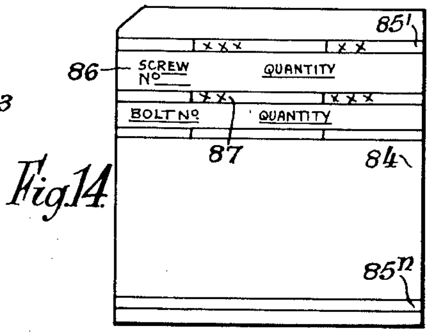
FIG. 14 is an illustration of an information sheet carrying printed matter and magnetic record areas and adapted to have signals added thereto for reproduction in duplicating or like processes.

Referring now to FIG. 14, the sheet 84 has a number of parallel magnetic record strips $85^{1-n}$ and has printed matter 86 for indicating where written matter is to be recorded corresponding to magnetic signals at 87 and the insertions are made with a hectograph sheet or like reproduction sheet below whereby visible entries made in the sheet at 86 can be duplicated or similarly reproduced for the transfer of such entries from selected lines to slips, cards or other record elements, such as slips for the receipt of goods from a store or vouchers relating to rates of pay, with a transference of the corresponding magnetic record to the slip at the same time.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What I claim is:

1. The method of preparing a record carrier which consists in the steps of first feeding sheets seriatim from a sheet supply to bring them into contact with a continuous strip having the properties of magnetic remanence and adhesiveness, applying pressure to cause the strip to adhere to each sheet, and severing the strip to leave a portion of the strip adhering to each sheet.

2. The method of claim 1, including maintaining a parallel relationship between the elongated magnetizable strip being applied and an edge of the sheet.

3. The method of claim 2, and including selectively determining the distance between the applied magnetizable elongated strip and an edge of the sheet when such strip is being applied to the sheet.

4. The method of claim 1 modified for preparing a composite accounting record and including the steps of first forming a sheet into an envelope form with one side thereof open, applying said strip over a small portion of the outer surface of the sheet, and inserting a second sheet bearing visually readable data into the envelope formed by the first sheet.

5. The method of claim 4 in which the envelope is wholly transparent.

References Cited in the file of this patent

UNITED STATES PATENTS

| | | |
|---|---|---|
| 1,653,467 | O'Neill | Dec. 20, 1927 |
| 1,838,389 | Goldberg | Dec. 29, 1931 |
| 1,843,572 | MacGahan | Feb. 2, 1932 |
| 2,224,646 | Friedman et al. | Dec. 10, 1940 |
| 2,247,908 | Dickinson | July 1, 1941 |
| 2,254,931 | Bryce | Sept. 2, 1941 |
| 2,265,419 | Brand et al. | Dec. 9, 1941 |
| 2,295,000 | Morse | Sept. 8, 1942 |
| 2,346,268 | Mills et al. | Apr. 11, 1944 |
| 2,357,455 | Bryce | Sept. 5, 1944 |
| 2,371,008 | Whittlesey | Mar. 6, 1945 |
| 2,427,383 | Bryce | Sept. 16, 1947 |
| 2,436,829 | Roth | Mar. 2, 1948 |
| 2,496,579 | Cheney et al. | Feb. 7, 1950 |
| 2,508,953 | Knutsen | May 23, 1950 |
| 2,538,520 | Holt et al. | Jan. 16, 1951 |
| 2,557,022 | Wolowitz | June 12, 1951 |
| 2,620,389 | Potter | Dec. 2, 1952 |
| 2,640,647 | Rand | June 2, 1953 |
| 2,650,024 | Ferrin | Aug. 25, 1953 |
| 2,650,830 | Potter | Sept .1, 1953 |
| 2,673,032 | Luhn | Mar. 23, 1954 |
| 2,680,239 | Daniels et al. | June 1, 1954 |
| 2,685,409 | English et al. | Aug. 3, 1954 |
| 2,718,356 | Burrell | Sept. 20, 1955 |
| 2,776,068 | Johnson | Jan. 1, 1957 |
| 2,797,370 | Bennett | June 25, 1957 |
| 2,808,871 | Brown | Oct. 8, 1957 |
| 2,826,525 | Blakslee et al. | Mar. 11, 1958 |
| 2,849,542 | MacChesney | Aug. 26, 1958 |

FOREIGN PATENTS

| | | |
|---|---|---|
| 393,763 | Canada | Jan. 7, 1941 |
| 651,645 | Great Britain | Apr. 4, 1951 |
| 725,184 | Great Britain | Mar. 2, 1955 |